Oct. 27, 1953　　J. C. HEWITT, JR　　2,656,616
OIL WELL SURVEY INSTRUMENT
Filed June 29, 1950　　3 Sheets-Sheet 1
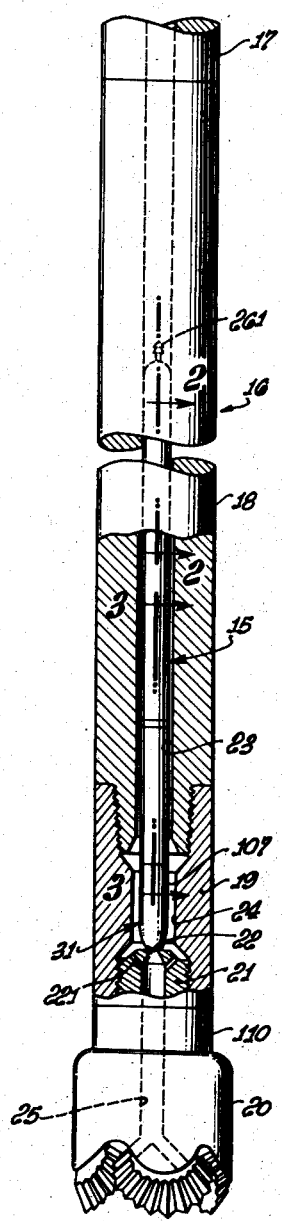
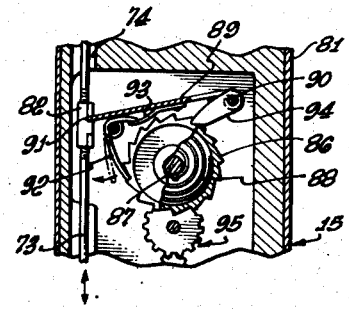
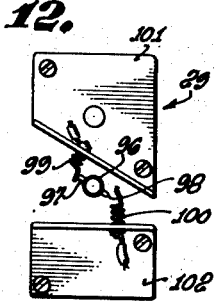
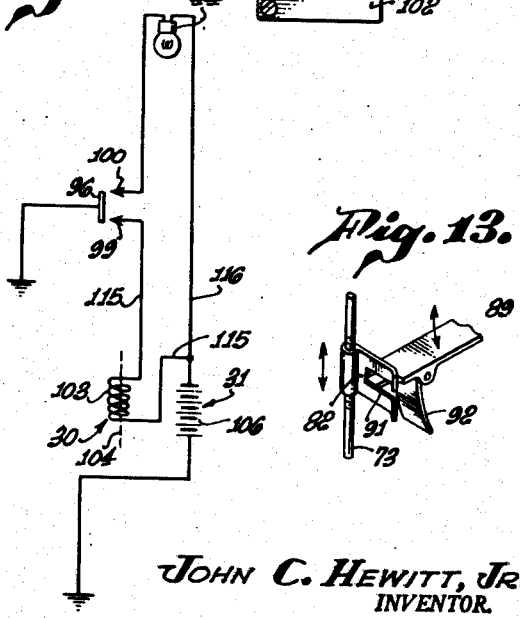
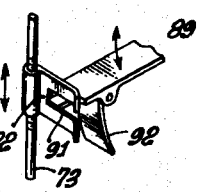
JOHN C. HEWITT, JR.,
INVENTOR.
BY
ATTORNEY.

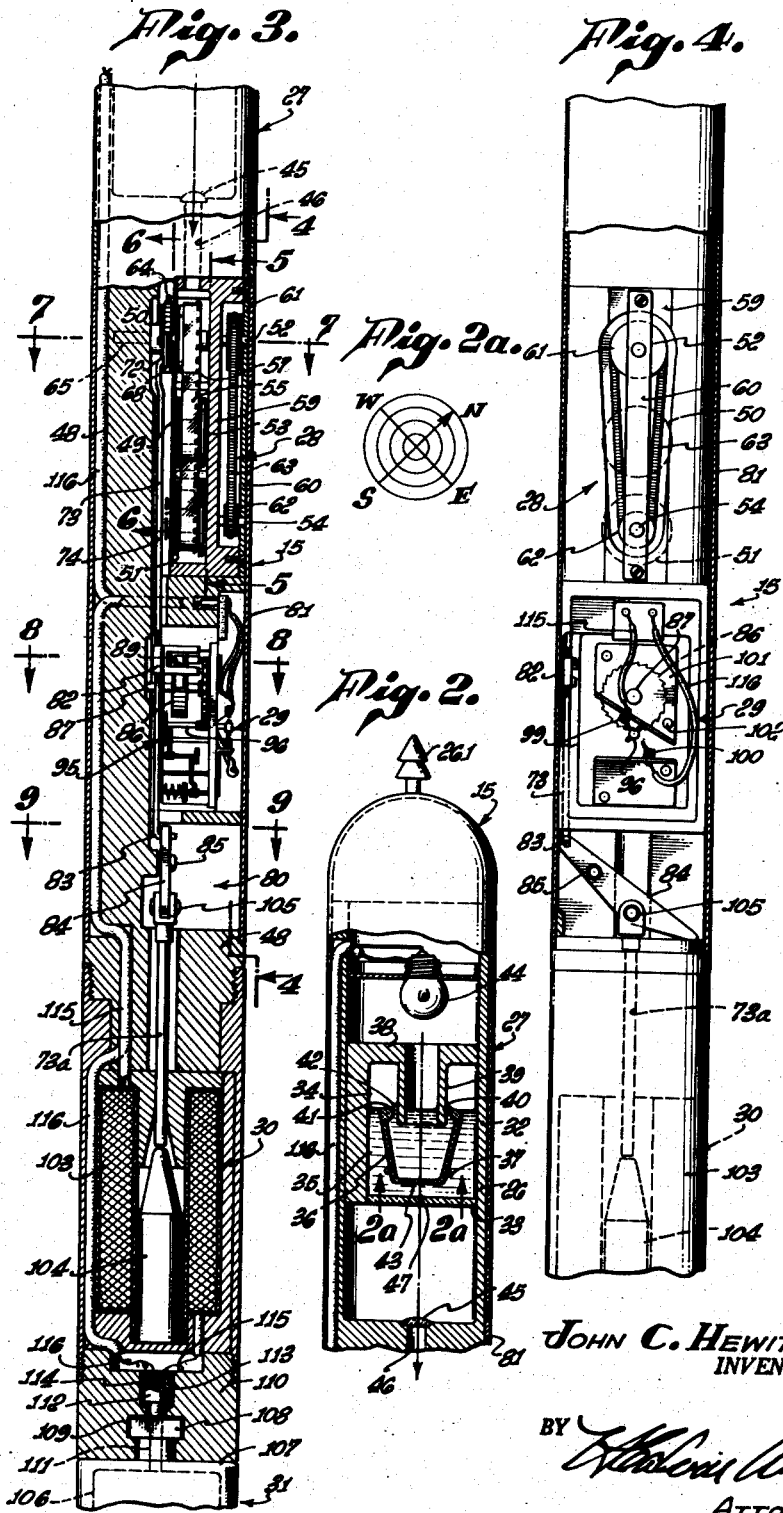

Oct. 27, 1953 J. C. HEWITT, JR 2,656,616
OIL WELL SURVEY INSTRUMENT
Filed June 29, 1950 3 Sheets-Sheet 3
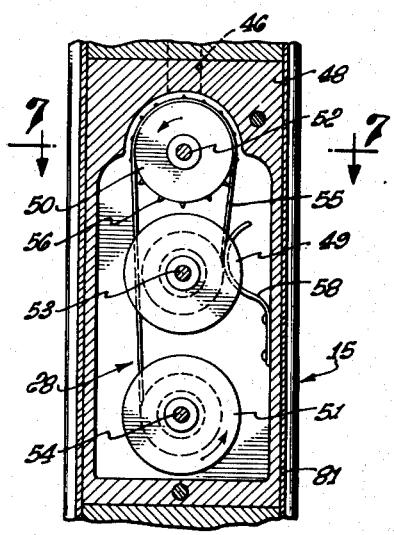
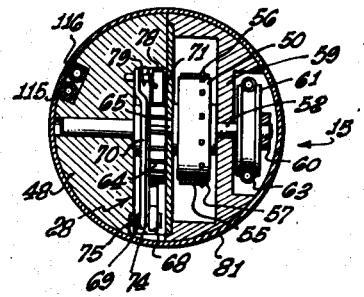
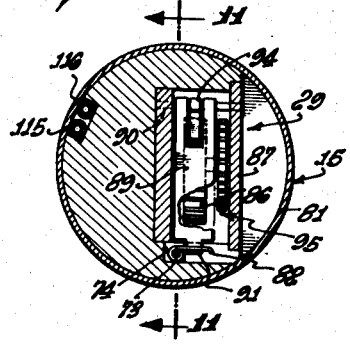
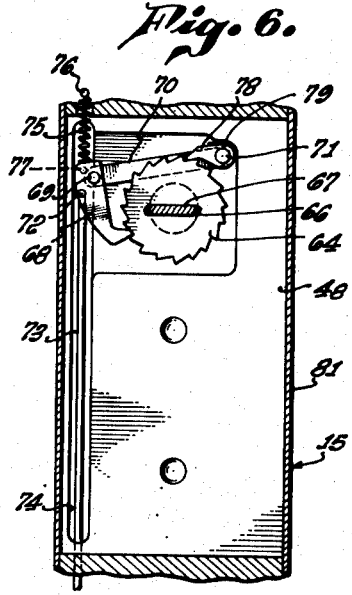
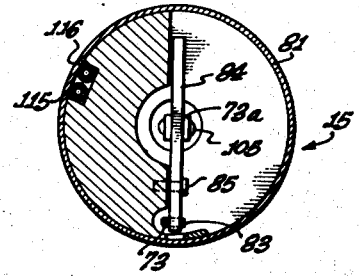
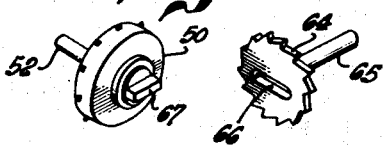
JOHN C. HEWITT, JR.,
INVENTOR.
BY
ATTORNEY.

Patented Oct. 27, 1953

2,656,616

UNITED STATES PATENT OFFICE 2,656,616

OIL WELL SURVEY INSTRUMENT

John C. Hewitt, Jr., Long Beach, Calif.

Application June 29, 1950, Serial No. 171,209

8 Claims. (Cl. 33—205.5)

This invention relates to improvements in oil well surveying instruments of the general type operable to produce a succession of records of the well bore inclination and azimuthal direction of the inclination.

My major object is to produce a well survey instrument so proportioned and constructed as to be capable of insertion and operation within standard drill pipe, and in accordance with its preferred method of use, to be capable of being dropped or pumped down to seating or operating position within the string. Although various so-called "multiple-shot" well survey instruments have been proposed in the past, and some used with varying degrees of success, the present invention is believed to make the first instance of a completely practical and commercially successful instrument of the multiple shot type that can be run in drill pipe, and particularly by a drop-in method.

The invention may be further characterized as contemplating an improved instrument employing the general combination of means preferably in the form of a floated compass, for indicating inclination and the azimuthal direction thereof, means for recording the compass position, and mechanism self-contained within the instrument and self-operating over whatever time is required for the survey operation, to produce a succession of records. Specifically contemplated is an actuating and timing control whereby successive records are made at substantially constant intervals between say 15 to 60 seconds, and preferably at about 30 second intervals, to produce distinct or indistinct recordings depending upon whether the instrument or compass are in motion, all as will later appear.

Structuralliy and more specifically considered, the invention has for its object the accommodation of the compass, film carrying, and actuating assemblies, together with batteries and associated switches and wiring, all within a casing capable of reception within standard drill pipe and having therefor a diameter not in excess of about 2 inches. A preferred construction, and one giving the instrument the ruggedness required for drop-in use, is to use a body structure longitudinally accomodating, supporting and affording rigid protection to certain of the parts otherwise subject to shock injury, and to arrange the various working units of the instrument in series longitudinally of the body, all as will now appear.

All the various features and objects of the invention, as well as the details of a typical embodiment, will be fully understood from the following detailed description of the accompanying drawings, in which:

Fig. 1 is a general showing of the instrument dropped down within a drill string, portions of which are broken away to expose the instrument;

Fig. 2 is a view showing in longitudinal section a top portion of the instrument represented by the lines 2—2 in Fig. 1;

Fig. 2a is a bottom view of the float taken from line 2a—2a of Fig. 2;

Fig. 3 is a longitudinal sectional view showing an intermediate portion of the instrument directly below that of Fig. 2, and is indicated by the lines 3—3 of Fig. 1;

Fig. 4 is a section taken in the plane of line 4—4 of Fig. 3;

Fig. 5 is a section line 5—5 of Fig. 3;

Fig. 6 is a section on line 6—6 of Fig. 3;

Fig. 7 is an enlarged cross section on line 7—7 of Figs. 3 and 5;

Figs. 8 and 9 are enlarged cross sections on lines 8—8 and 9—9 of Fig. 3;

Fig. 10 is a view showing in perspective the ratchet and film sprocket wheels appearing in Fig. 7;

Fig. 11 is a fragmentary section taken on line 11—11 of Fig. 8;

Fig. 12 is an enlargement of the switch appearing in Fig. 4;

Fig. 13 is a perspective showing of the intersection between the actuating rod and the clock-winding lever appearing in Fig. 11; and Fig. 14 is a wiring diagram of the instrument.

Referring first to Fig. 1, the surveying instrument, generally indicated at 15, is shown to be lowered or dropped to seating position within a pipe string, termed also a drill string 16, shown typically as comprising the usual steel drill pipe 17, a non-magnetic metal sub or drill collar 18 connected at its lower end by coupling 19 with an oil well tool, such as the drill bit 20. The bit pin 21 is shown to be threaded into the lower box end of coupling 19 to present a seat 22 engaged by the lower end of the instrument 15, the latter thus in its operating position being located within the non-magnetic section 16 of the drill string and closing or restricting the downward flow of circulating fluid through bores 23 and 24 to the fluid discharge passage 25 in the bit.

Referring now more particularly to the instrument 15, its working parts are contained within an elongated tubular non-magnetic case 26 closed at its upper and lower ends and provided with an appropriate top projection 26I in order that if for any reason it is desired to raise or lower the instrument within the drill string on a wire line, the latter may be attached to the instrument by a suitable overshot or grapple releasably engageable with the projection 26l. In the order of their downward positional sequence within the case 15, the working parts of the instrument comprising first, and at the top, a float instrument generally indicated at 27 by means of which is indicated the degree of inclination of the drill string and well bore as well as the azimuthal direction of the inclination; a photographic record receiving device 28 directly below the instrument 27; a clockworks drive 29 for effecting intermittent illumination of the light source in the instrument 27; a power device, typically of the solenoid type, generally indicated at 30 and operating to intermittently actuate the recording device 28 and wind the clockworks 29; and finally one or more batteries at 31 in the bottom of the case for energizing the solenoid and switch. Referring particularly to Fig. 2, the directional inclination indicating instrument preferably is of the general type employing a compass float in such relation to a light source as to permit photographically recording the position of directional inclination markings on the float in relation to a reference marking stationarily located with relation to the body of the instrument. As illustrative, the drawing shows the general type of instrument shown and described in greater detail in the copending Hewitt application, Serial No. 78,713, filed February 28, 1949, on Well Surveying Instrument. For present purposes it will suffice to describe the instrument 27 as comprising a container 32 having a transparent wall 33 forming the bottom of a float chamber 34 containing a body of liquid 35. Within the chamber is a hollow float 36 carrying a compass "needle" 37 here shown to be in ring form carried by the float 36 and serving to orient the float in accurate relation to the earth's magnetic poles. The container has a second transverse wall 38 from which depends a guide tube 39 received within and in spaced relation to opening 40 in the top of the float. Immediately surrounding the opening 40 and in spaced relation to the outer cylindrical surface of the tube 39, the float has an upstanding annular rim 41. As more fully developed in the aforementioned Hewitt application, the float 36 is made of a non-magnetic material whose specific gravity is slightly less than the specific gravity of the liquid 35, so that the tendency of the float is to push up through the top surface of the liquid. As illustrated, the liquid forms adjacent and about the cylindrical surface of the tube 39 an annular, upwardly curved meniscus 42 which is engaged by the float rim 41 to maintain the float, in a static condition of the instrument, in spaced relation to the guide tube, and therefore in a freely rotatable condition such as will assure accurate alinement of the compass needle 37 with the magnetic poles of the earth. The bottom surface 43 of the compass may carry suitable inclination and azimuth indicia, such as concentric circle inclination markings, and radial azimuth indicating markings, for example of the usual character illustrated in Fig. 2a. Above wall 38, the instrument contains a lamp 44, light rays from which pass downwardly through the tube 39 and the translucent liquid 35, float 36 and wall 33 to a lens 45 from which the light beam is projected down through bore 46 onto the later described film. The latter receives a record of the float position in relation to a stationary marking, such as that indicated at 47 and carried by the wall 33.

Referring now to Figs. 3 to 7 and 10, the recording device 28 comprises a suitable body or housing 48 containing a film supply reel 49, the film driving sprocket 50 and a take-up reel 51, carried respectively on shafts 52, 53 and 54. From the supply reel 49, the film 55 passes upwardly and over the sprocket 50, the teeth 56 of which enter the film perforations 57 to drive the film in direct accordance with the rotation of the sprocket, the film thence being passed downwardly for take-up on the reel 51. Film-releasing rotation of reel 49 is lightly resisted by the drag spring 58.

As particularly illustrated in Figs. 3 and 4, shafts 52 and 54 carry between the vertical housing wall 59 and the detachable support 60, a pair of sheave wheels 61 and 62, the former of which drives wheel 62 by way of belt 63 so that the take-up reel 51 is positively rotated to wind the film let off from the sprocket 50.

The sprocket 50 is driven by a ratchet gear 64 carried on shaft 65 and releasably engageable with the sprocket by way of slot 66 in the ratchet which receives the sprocket-carried lug 67, see Figs. 6 and 10. The ratchet wheel 64, and from it shafts 52, 54 and the sprocket, take-up reel and sheave wheels carried thereby, are rotated intermittently by the movements of a pawl 68 pivotally carried at 69 on an arm 70 which in turn is pivoted at 71 to the body structure 48. Pivoted also to the pawl 68 at 72 is a vertical reciprocable actuating rod 73 extending within opening 74 in the body. Upward displacement of the free end of arm 70, together with the pawl and actuating rod, is resisted by coil spring 75 depending from its stationarily fixed end 76 to a point of connection at 77 with the pawl. A second pawl 78 rotatable on pivot 71 and pressed against the sprocket by spring 79, prevents rotation of the sprocket in a clockwise direction.

At this point it may be observed that intermittent vertical reciprocations of the rod 73 cause the pawl 68 to rotate ratchet 64 counterclockwise, and to drive the previously described parts in driven relation to the ratchet, at a constant or uniform annular degree of rotation in response to each reciprocation of the actuating rod. Accordingly, successive actuations of the rod and pawl advance the film 55 at uniform intervals of travel for the reception of successive images of the float position.

The body structure 48 containing the recording mechanism 28, and which may be regarded as including also the removable supporting section 59, accommodates also the clockworks mechanism 29. As best illustrated in Fig. 3, the body 48 is recessed at 80 to receive both the recording and clockworks mechanism in their illustrated vertical sequence, and to provide a continuity of supporting structure extending from below to above the mechanisms, all in a manner giving to the instrument adequate strength to withstand all normal shocks to which it may be subject, while affording, together with the surrounding sleeve 81, full protection for the mechanisms 28 and 29.

From pawl 68, the rod 73 extends downwardly to a bifurcation 82, and thence to a pivotal connection at 83 with a lever 84 carried intermediate its ends by the stationary pivot 85. The clockworks mechanism 29 comprises a winding device (see Fig. 11) employing a hollow body ratchet 86 rotatable on shaft 87 and containing a coil spring 88, the inner end of which is fixed to the shaft, with the outermost turn of the spring bearing in frictional engagement with the inner cylindrical surface of the ratchet. By this arrangement, the spring tends to rotate the shaft and the parts driven thereby. The spring is windable by counterclockwise rotation of the ratchet, without possibility of overwinding the spring, since the ratchet has merely a frictional winding engagement therewith. A lever 89 pivoted on pin 90 has its free end received at 91 within the actuating rod-carried bifurcation 82, see Fig. 13, and the lever carries a pawl 92 pressed by spring 93 against the sprocket teeth. As will be apparent, the sprocket is rotated counterclockwise a constant angular distance as a result of each reciprocation of the rod 73. Reverse rotation of the sprocket is prevented by a spring-urged pawl 94 pivoted on the pin 90. Shaft 87 constitutes the motor shaft of the clockworks, and from which is driven through any suitable arrangement of gears and countershafts, all of which are conventionally indicated at 95, a switch shaft 96 so that the latter is rotated in response to each rotation of shaft 87, a constant predetermined angular distance. The switch shaft carries a pair of contacts 97 and 98 engageable sequentially with spring pawls 99 and 100 carried respectively by supports 101 and 102.

Referring again to Fig. 3, the motor 30 is of a reciprocating type comprising a coil 103 containing a plunger core 104 engageable upwardly against a link section 73a of the actuating rod 73 and pivotally connected at 105 to the lever 84. As will be understood, as the coil 103 is energized, the plunger core 104 is displaced upwardly to raise the actuating rod 73 against the resistance of spring 75 and cause the pawls 68 and 92 to engage successive teeth of the ratchets 64 and 86. Upon deenergization of the coil 103, the solenoid plunger and actuating rod are displaced downwardly and the ratchets 64 and 86 are rotated in their recorder and clock-winding actuations, as previously described.

Electrical current is supplied to the motor 30 and illumination source 44 by one or more batteries 106 in an insulated container 107 having a neck portion 108 received within a transverse slot 109 in the body portion 110. The battery pole 111 extends upwardly through the neck 108 and is engaged by a contact element 112 in an insulated container 113, the element being pressed against the battery pole by spring 114 which serves as a conductor to leads 115 and 116. As will be seen by reference to the wiring diagram of Fig. 14, lead 115 connects with the solenoid coil 103 and thence with the switch pawl 99. Lead 116 contains in its circuit the lamp 44 and connects with the switch pawl 98. The locations of the leads 115 and 116 extending from the battery and solenoid to the switch and lamp, are clearly illustrated in Figs. 3 and 4, and the cross sectional views of Figs. 7 to 9.

In considering the operation of the instrument, assume the drill string 16 to be run down in the well to its bottom, or to any other depth at which the survey is to be started. The assembled and closed instrument in the case 26 is started in operation by making the battery connection with the solenoid and lamp circuits, so that at the outset the instrument starts in operation by making intermittent advancements of the film and the recording mechanism, followed by correspondingly intermittent illuminations of the lamp. Preferably the timing of the instrument is so regulated as to effect intermittent energization of the recorder and lamp at intervals between about 15 to 60 seconds, and preferably at about one-half minute. The instrument is dropped freely down within the drill string bore, with or without simultaneous pumping of a circulating or cooling mud or other fluid down through the string. In comparison with past procedures of running multiple survey instruments, the present instrument reaches its seating position of Fig. 1 at the survey location within a short period of time affording little opportunity for the instrument to become dangerously heated, if the survey happens to be conducted in a high temperature zone.

While the instrument is in a state of motion in being inserted and lowered within the drill string, the compass float 36 is agitated and the compass needle in unstable, with the result that the pictures taken on the recorder film during this and all other times that the instrument is in motion, are blurred or indistinct to the extent that they are readily distinguishable from the pictures taken at such times as the float is in a stable or static condition. Upon arrival of the instrument to its seating position of Fig. 1, the drill string is kept perfectly stationary for a length of time that will permit the float and compass to reach exact equilibrium with the earth's magnetic forces, and thereafter to permit at least one, and preferably two or three pictures to be taken of the float in perfectly static condition. Thus in operation, after arrival of the instrument at its seating position is indicated at the ground surface by resistance to fluid circulation down through the string, the latter is kept stationary for a period of say about three minutes within which the fluid will stabilize and the recorder will make a number of pictures of the float position which, as previously indicated, establishes the degree of the instrument, string and well bore inclination, and the direction of that inclination.

Thereupon the drill string is elevated any suitable and measurable distance, such as the height of one pipe stand removed from the string upon its elevation. While the string is being raised, the instrument again becomes agitated and any pictures taken by the recorder are indistinct. Following removal of the pipe stand, the drill string is again held perfectly still until the compass float stabilizes and the recorder makes at least one, and perhaps two or three pictures of the static float. This procedure may be repeated throughout elevation of the entire pipe string, or any length thereof corresponding to the portion of the well bore to be surveyed. Knowing the length or depth of the pipe string and instrument at the start of the survey, and by measurements of the drill pipe or its stands taken at the depth of each successive recording, an accurate graph may be plotted showing the inclination and direction of that inclination, throughout the survey extent of the well bore. Because of the speed with which the instrument may be dropped down to the starting survey depth, and the fact that the pipe string thereafter may be pulled from the well with only short delays for accommodating the successive recordings of the instrument, the entire survey may be conducted at minimum time loss and expense, and with accurate results.

I claim:

1. In an inclinable well surveying instrument comprising an elongated case containing a compass device operable to indicate the direction of the instrument inclination, a compass illumination source, a recorder acting to make successive photographic records of the compass device positions, a motor operating to actuate the recorder at predetermined time intervals, battery means for supplying current to the motor and illumination source, a clockworks mechanism operating to control intermittent actuations of the recorder, and means actuated by the motor for winding said clockworks mechanism.

2. In an inclinable well surveying instrument comprising an elongated case containing a compass device operable to indicate the direction of the instrument inclination, a compass illumination source, a recorder acting to make successive photographic records of the compass device positions, a motor operating to actuate the recorder at predetermined time intervals, battery means for supplying current to the motor and illumination source, and a clockworks mechanism operating to control intermittent actuations of the recorder, said compass device, recorder, motor and clockworks mechanisms being arranged in vertical sequence within the case, and an actuating rod extending vertically from the motor to operative connections with the recorder and clockworks mechanism, said clockworks mechanism including winding means actuable by said rod to wind the clockworks mechanism upon movement of the rod by said motor.

3. In an inclinable well surveying instrument comprising an elongated case containing a compass device operable to indicate the direction of the instrument inclination, a compass illumination source, a recorder acting to make successive photographic records of the compass device positions, a motor operating to actuate the recorder at predetermined time intervals, battery means for supplying current to the motor and illumination source, and a clockworks mechanism operating to control intermittent actuations of the recorder, said compass device, recorder, motor and clockworks mechanism being arranged in vertical sequence within the case, a reciprocable actuating rod extending vertically from the motor, a driving connection between said rod and the recorder, and a connection between said rod and the clockworks mechanism, said clockworks mechanism including winding means actuable by said rod to wind the clockworks mechanism upon movement of the rod by said motor.

4. An inclinable well surveying instrument comprising an elongated case, a supporting body structure extending longitudinally within the case and containing intermediate the ends of the body a lateral recess, a compass device in the case operable to indicate the direction of the instrument inclination, a compass illumination source, a recorder contained in said recess and acting to make successive photographic records of the compass device positions, a motor operating to actuate the recorder at predetermined time intervals, battery means for supplying current to the motor and illumination source, a clockworks mechanism contained in said recess and operating to control intermittent actuations of the recorder, an actuating rod extending vertically from the motor along one side of said recess, a driving connection between said rod and the recorder and a connection between said rod and the clockworks mechanism, said clockworks mechanism including winding means actuable by said rod to wind the clockworks mechanism upon movement of the rod by said motor.

5. An inclinable well surveying instrument adapted to be dropped freely within standard drill pipe and comprising an elongated case of smaller diameter than the drill pipe bore, said case containing a compass device operable to indicate the direction of the instrument inclination, a compass illumination source, a recorder acting to make successive photographic records of the compass device positions, a motor operating to actuate the recorder at predetermined time intervals, battery means for supplying current to the motor and illumination source, a clockworks mechanism operating to control intermittent actuations of the recorder, and an actuating connection between said motor and the recorder and clockworks mechanism extending longitudinally within the case near the wall thereof opposite and in offset relation to said recorder and clockworks mechanism said clockworks mechanism including winding means actuable by said motor through said connection.

6. An inclinable well surveying instrument adapted to be dropped freely within standard drill pipe and comprising an elongated case of smaller diameter than the drill pipe bore, said case containing a compass device and illumination source within the upper interior of the case and operable to indicate the degree and direction of the instrument inclination, a record directly below the compass device and acting to make successive photographic records of the compass device positions, a clockworks mechanism below the recorder and operable to control intermittent actuations thereof, a vertically reciprocable solenoid motor below the clockworks mechanism and operating to actuate the recorder at predetermined time intervals, an elongated actuating member vertically reciprocable by said motor and extending upwardly from the motor past the clockworks mechanism to a driving connection with the recorder, battery means in the case for supplying current to the motor and illumination source, and a connection between said elongated member and the clockworks mechanism, said clockworks mechanism including winding means actuable by said member to wind the clockworks mechanism upon vertical movement of the member by said motor.

7. An inclinable well surveying instrument adapted to be dropped freely within standard drill pipe and comprising an elongated case of smaller diameter than the drill pipe bore, said case containing a compass device and illumination source within the upper interior of the case and operable to indicate the degree and direction of the instrument inclination, a recorder directly below the compass device and acting to make successive photographic records of the compass device positions, a clockworks mechanism below the recorder and operable to control intermittent actuations thereof a vertically reciprocable solenoid motor below the clockworks mechanism and operating to actuate the recorder at predetermined time intervals, an elongated actuating member vertically reciprocable by said motor and extending upwardly from the motor past the clockworks mechanism to a driving connection with the recorder, battery means in the case for supplying current to the motor and illumination source, switch means actuated by the clockworks mechanism and operating to intermittently and sequentially energize said recorder and illumination source, and a connection between said elongated member and the clockworks mechanism, said clockworks mechanism including winding means actuable by said member to wind the clockworks mechanism upon vertical movement of the member by said motor.

8. An inclinable well surveying instrument adapted to be dropped freely within standard drill pipe and comprising an elongated case of smaller diameter than the drill pipe bore, said case containing a compass device and illumination source within the upper interior of the case and operable to indicate the degree and direction of the instrument inclination, a recorder directly below the compass device and acting to make successive photographic records of the compass device positions, a clockworks mechanism below the recorder and operable to control intermittent actuations thereof, a vertically reciprocating solenoid motor below the clockworks mechanism and operating to actuate the recorder at predetermined time intervals, battery means in the case for supplying current to the motor and illumination source, and switch means actuated by the clockworks mechanism and operating to intermittently and sequentially energize said recorder and illumination source, a vertically reciprocating actuating rod extending from said motor longitudinally within the case opposite and in offset relation to said recorder and clockworks mechanism, a ratchet driving connection between said rod and the recorder, and a connection between said rod and the clockworks mechanism, said clockworks mechanism including winding means actuable by said rod to wind the clockworks mechanism upon movement of the rod by said motor.

JOHN C. HEWITT, Jr.

References Cited in the file of this patent

UNITED STATES PATENTS

| Number | Name | Date |
| --- | --- | --- |
| 327,898 | Pond | Oct. 6, 1885 |
| 950,896 | Dean | Mar. 1, 1910 |
| 1,495,112 | Sauter | Mar. 20, 1924 |
| 1,833,889 | Carlton | Dec. 1, 1931 |
| 1,910,720 | Tarlton | May 23, 1933 |
| 1,912,768 | Gilbert | June 6, 1933 |
| 2,012,455 | Bazzoni | Aug. 27, 1935 |
| 2,146,119 | Hobbs | Feb. 7, 1939 |
| 2,338,028 | Doll | Dec. 28, 1943 |

FOREIGN PATENTS

| Number | Country | Date |
| --- | --- | --- |
| 1,821 | Great Britain | of 1908 |
| 351,745 | Great Britain | of 1931 |